(12) United States Patent
Lundgren

(10) Patent No.: US 6,516,985 B1
(45) Date of Patent: Feb. 11, 2003

(54) LOAD CARRIER

(75) Inventor: Anders Lundgren, Grimsås (SE)

(73) Assignee: Thule Sweden AB (SE)

( * ) Notice: Subject to any disclaimer, the term of this patent is extended or adjusted under 35 U.S.C. 154(b) by 0 days.

(21) Appl. No.: 09/641,055

(22) Filed: Aug. 17, 2000

Related U.S. Application Data

(63) Continuation of application No. 08/737,401, filed as application No. PCT/SE95/00508 on May 9, 1995, now abandoned.

(30) Foreign Application Priority Data

May 25, 1994 (SE) .............................................. 9401791

(51) Int. Cl.$^7$ .............................................. B60R 9/058
(52) U.S. Cl. ...................................... 224/331; 224/322
(58) Field of Search .............................. 224/321–3, 329, 224/331, 550, 326, 327

(56) References Cited

U.S. PATENT DOCUMENTS

| | | | | |
|---|---|---|---|---|
| 4,757,929 A | * | 7/1988 | Nelson ........................ 224/329 |
| 4,809,943 A | * | 3/1989 | Taschero ................. 224/329 X |
| 5,226,570 A | * | 7/1993 | Pedrini ........................ 224/329 |
| 5,275,320 A | * | 1/1994 | Duemmler ............... 224/321 X |

\* cited by examiner

*Primary Examiner*—Renee Leubke
(74) *Attorney, Agent, or Firm*—Howrey Simon Arnold & White, LLP

(57) ABSTRACT

A load carrier which consists of a load carrier strut which, at each end region, has a foot with a support portion and a clamping portion for securing the load carrier transversely over a vehicle roof. At at least one end portion of the load carrier strut, the foot is displaced within a displacement range. By means of a rotary shaft disposed interiorly in the load carrier strut, the clamping portion is maneuverable between an open position and a locking position for securing the load carrier on the vehicle. Suitably, one rotary shaft is provided in each end region of the load carrier strut. In the open position of the clamping portion, the foot is freely movable within its displacement range. The foot is fixable in any optional position within its displacement range by fixing means extending into the interior of the load carrier strut for operation via the rotary shaft.

10 Claims, 2 Drawing Sheets

LOAD CARRIER

RELATED PATENT APPLICATIONS

This is a continuation patent application of U.S. application Ser. No. 08/737,401 filed Nov. 8, 1996 and now abandoned, entitled LOAD CARRIER which is a national stage patent application of International Application No. PCT/SE95/00508 dated May 9, 1995 which claims the benefit of Swedish Application No. 9401791-0 dated May 25, 1994; said applications in their entireties are hereby expressly incorporated by reference into the present application.

DESCRIPTION

Technical Field

The present invention relates to a load carrier of the type which comprises a load carrier strut extending transversely over a vehicle roof and provided, at each end region, with a foot having a support portion and a clamping portion for securing the load carrier to the vehicle, the foot being displaceable within a displacement range at least one end region of the load carrier strut, and the clamping portion being switchable between an open position and a clamping position for securing the load carrier onto the vehicle roof by means of a rotary shaft interiorly disposed in the load carrier strut.

BACKGROUND ART

A load carrier of the type intimated by way of introduction is described in U.S. Pat. No. 5,226,570. According to this publication, the load carrier has a shaft which is threaded in opposing turns and which extends in the longitudinal direction of the entire load carrier strut and which is, interiorly therein, in engagement with the feet disposed on the load carrier strut so that they, on rotation of the shaft in the one direction, are moved towards one another, while being shifted in the opposite direction on opposite rotation of the shaft. The design and construction according to this prior art publication are further such that the clamping portions of the feet are drawn upward towards clamping positions when the feet move towards one another and when such movement meets with resistance.

The design and construction according to this publication suffer from a major drawback as a result of the long, through-going shaft disposed interiorly in the load carrier strut, since even a very slight downward flexing of the load carrier strut caused by a load may bring about seizure or result in permanent damage in the mechanism.

Furthermore, since the load carrier according to this US publication is fixed exclusively from the one side of the vehicle, there is the risk of incorrect mounting in place, since it is not possible to monitor the fixing of both ends of the load carrier.

The prior art design and construction are further such that tightening of the clamping portions only takes place as a result of the resistance to which the feet are subjected on tightening of the threaded shaft. This implies that the positions of the support portions and the feet in relation to the vehicle are not determined beforehand but depend upon the resistance to which the clamping portions are subjected, or their initial placing on the vehicle.

In view of the above described deficiencies associated with the use of known designs for bicycles carriers, the present invention has been developed to alleviate these drawbacks and provide further benefits to the user. These enhancements and benefits are described in greater detail hereinbelow with respect to several alternative embodiments of the present invention.

DISCLOSURE OF THE INVENTION

The present invention in its several disclosed embodiments alleviates the drawbacks described above with respect to conventionally designed rear mounted bicycle carriers and incorporates several additionally beneficial features.

The present invention has for its object to design the load carrier intimated by way of introduction in such a manner that the drawbacks inherent in prior art versions are obviated. In particular, the present invention has for its object to realize a load carrier in which a downward flexing of the load carrier strut does not cause any problems. The present invention further has for its object to realize a load carrier in which the feet and support portions may be pre-set before mounting of the load carrier is put into effect. The present invention finally has for its object also to realize a load carrier which is simple and economical in manufacture, which is easily handled and which offers a very high degree of reliability.

The objects forming the basis of the present invention will be attained if the load carrier intimated by way of introduction is characterized in that, in the open position of the clamping portion, the foot is freely movable within its displacement range, that the foot is provided with fixing means for its fixing in any optional position within the displacement range, the fixing means extending into the interior of the load carrier strut for operation via the rotary shaft.

As a result of these characterizing features, a design and construction will be achieved in which the feet may be pre-set before the clamping operation proper is commenced.

According to the invention, the load carrier is also suitably characterized in that a rotary shaft is provided in each end region of the load carrier strut.

These characterizing features afford the advantages that a downward flexing or bending of the load carrier strut will not cause any problems, and that the risk of incorrectly mounting the load carrier in place is eliminated, because securing of the load carrier must be put into effect from both ends.

The load carrier according to the present invention is further suitably characterized in that the fixing means comprise a fixing portion which has a projection in cooperation with a rotary eccentric or cam portion, whereby the fixing portion is, by rotation of the eccentric or cam portion, switchable between an open position and a preliminary locking position where the load carrier strut and the foot are pre-set in relation to one another.

These characterizing features afford the advantage that the load carrier may be pre-set in response to the requirements of a given vehicle and that this pre-setting may be retained unchanged even after dismounting of the load carrier.

The beneficial effects described above apply generally to the exemplary devices and mechanisms disclosed herein of the rear mounted bicycle carriers. The specific structures through which these benefits are delivered will be described in detail hereinbelow.

BRIEF DESCRIPTION OF THE DRAWINGS

The invention will now be described in greater detail in the following way of example only and with reference to the attached drawings, in which.

MODE(S) FOR CARRYING OUT THE INVENTION

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a basis for the claims and as a representative basis for teaching one skilled in the art to variously employ the present invention.

Furthermore, elements may be recited as being "coupled"; this terminology's use contemplates elements being connected together in such a way that there may be other components interstitially located between the specified elements, and that the elements so specified may be connected in fixed or movable relation one to the other.

Figure 1:
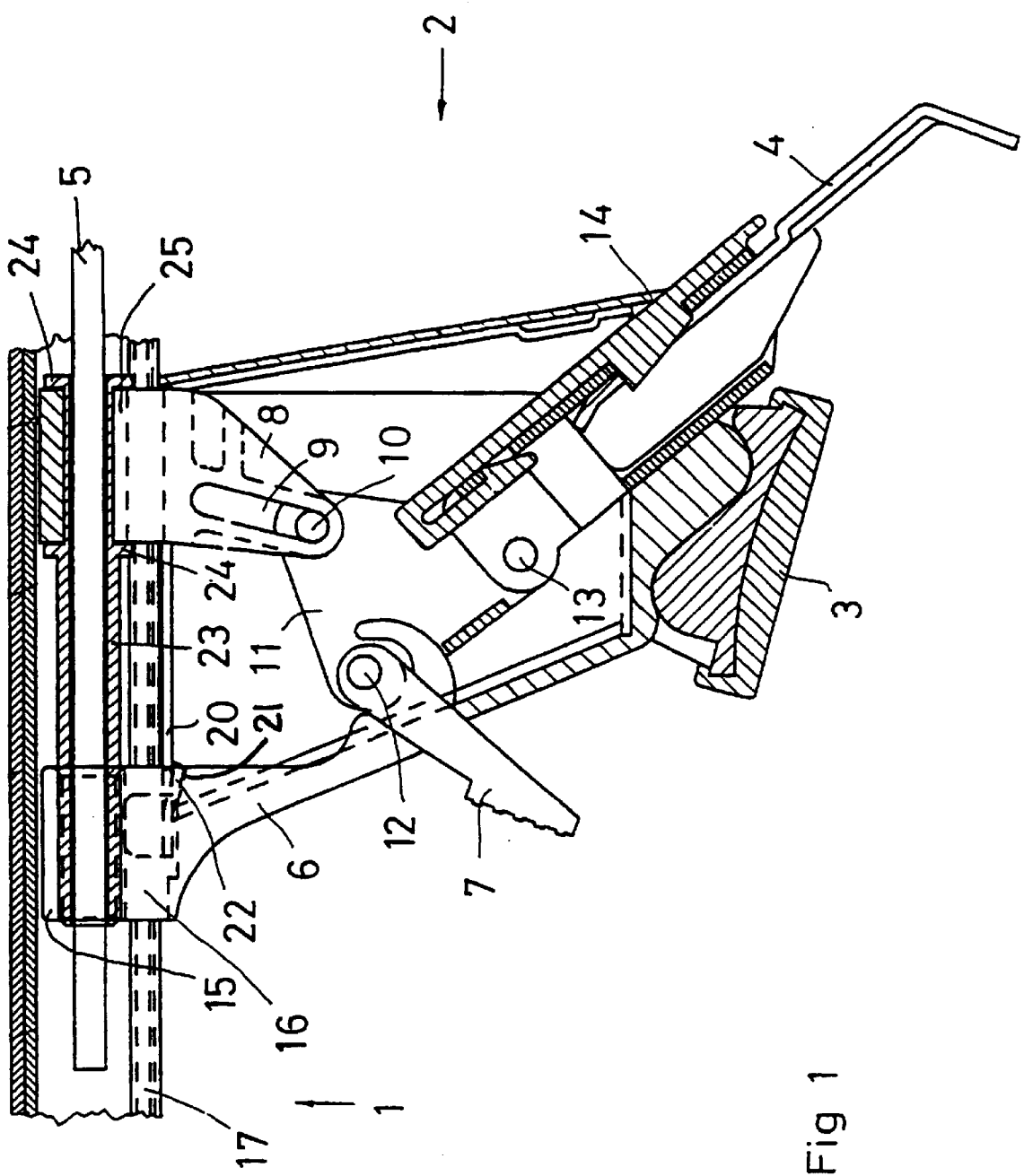
FIG. 1 is a vertical section through an end portion of a load carrier strut and a foot disposed thereat.

In FIG. 1, reference numeral 1 relates to a load carrier strut which extends transversely over a vehicle roof and which is intended to be secured at the opposing side edge regions thereof by means of feet 2 which include, first a support portion 3 for abutment against the vehicle roof and, secondly, a clamping portion 4 for clamping in place against an edge portion of the roof. According to the invention, the foot 2 is freely adjustable or displaceable within a displacement range in the longitudinal direction of the load carrier strut, this displacement range at least extending along one end portion of the load carrier strut.

The right-hand end of the load carrier strut 1 is not shown in FIG. 1, since this may be designed in a plurality of different ways and, depending upon the position of the foot 2, may also extend a greater or lesser distance outside the foot. However, it will be apparent from the Figure that a rotary shaft 5 is disposed in the end region of the load carrier strut 1 and interiorly therein, the shaft being, in its right-hand end in the Figure, connected to a suitable knob or wheel. The purpose of the rotary shaft 5 is, by its rotation, to impart a clamping movement to the clamping portion 4 so that this will have a horizontal movement component, approximately parallel with the longitudinal direction of the load carrier strut 1, in towards the longitudinal center line of the vehicle, and a vertical movement component upwards towards the load carrier strut 1.

The rotary shaft 5 is further disposed for activation of fixing means, by which the foot 2 may be positionally fixed in any optional position within its displacement range. The design and construction are such that, on rotation of the shaft 5, the foot is first positionally fixed along the load carrier by an initial and slight rotary operation of the shaft 5. It is not until after that initial fixation upon the load carrier strut that the clamping portion 4 is subjected to any major force which, in the final phase, results in the clamping of the load carrier in place on the vehicle.

Figure 2A:
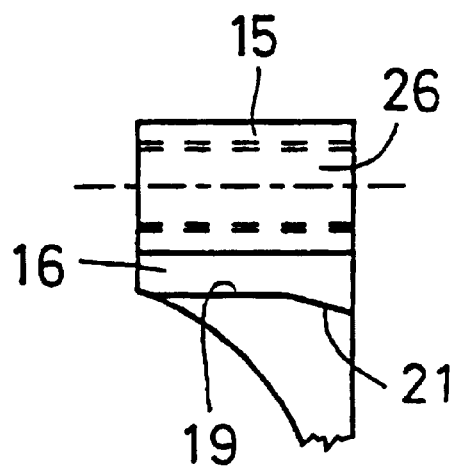
FIG. 2a shows a side view of a fixing portion of a foot for a load carrier according to the present invention.
Figure 2B:
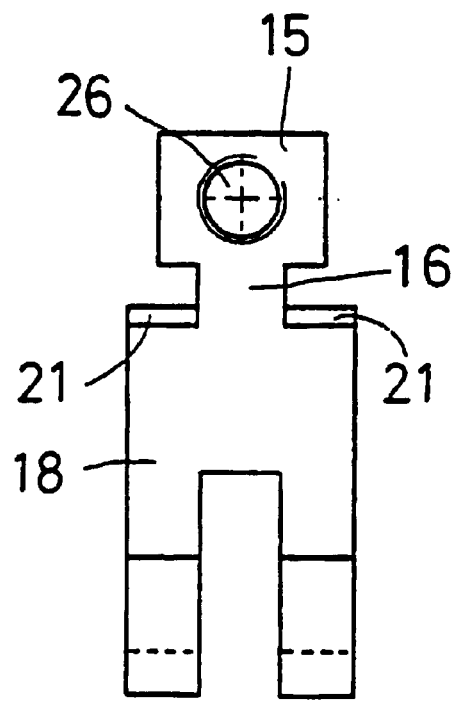
FIG. 2b shows a front view of a fixing portion of a foot for a load carrier according to the present invention.
Figure 3A:
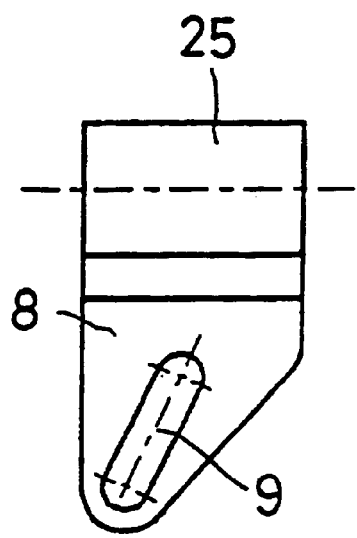
FIG. 3a shows a side view of an operating portion of a foot for a load carrier according to the present invention.
Figure 3B:
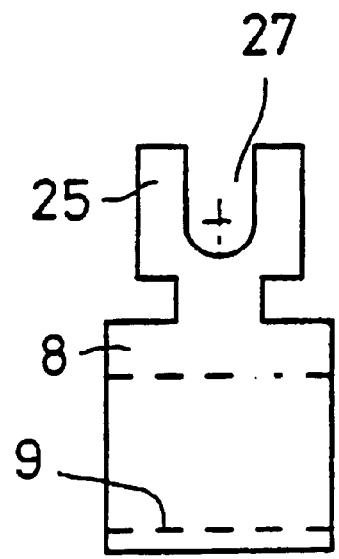
FIG. 3b shows a front view of an operating portion of a foot for a load carrier according to the present invention.

The fixing means comprise a fixing portion 6 (see also FIGS. 2a and 2b) which has a projection 18 extending downwards from the load carrier strut 1 to cooperate with a rotary eccentric or cam portion 7. By turning this to a preliminary locking position, the fixing portion is influenced so that the fixing means are thereby activated and at least preliminarily (in a pre-set position) positionally fix the foot 2 and the load carrier strut 1.

For operating the clamping portion 4, the foot 2 includes an operating mechanism with an operating portion 8 which, with an upper part 25, extends up into the interior of the load carrier strut 1. The operating portion 8 is movable in the longitudinal direction of the load carrier strut 1 and has, in its lower part located interiorly in the foot 2, a vertically extending slot 9 in which is accommodated a pin 10 on a rocker 11. The rocker 11 is journalled in the foot 2 via a stub shaft 12 secured in the foot and about which the rocker is pivotal. The rocker 11 is approximately triangular in configuration, the stub shaft 12 being located in one corner, the pin 10 in the second corner and a further pin 13 in the third corner. The pin 13 pivotally connects the rocker 11 with the clamping portion 4.

When the operating portion 8 is displaced from the position illustrated in FIG. 1 in the longitudinal direction of the load carrier strut 1 to the left, the rocker 11 will be pivoted in a counterclockwise direction about the stub shaft 12. As a result, the pin will first experience movement having a horizontal component to the right, whereby the clamping portion 4 is pivoted with its lower end in the opposite direction, since the clamping portion is, in a central region, in contact with an abutment 14 in the foot 2. On continued displacement of the operating portion 8, the rocker 11 is rotated further, for which reasons movement of the pin 13 will be more upwardly directed, whereby the clamping portion 4 will also be lifted upward for fixedly clamping the load carrier.

On displacement of the operating portion 8 in the opposite direction, the pattern of movement will be the reverse.

Interiorly in the load carrier strut 1, the fixing portion 6 has a pressure device 15 which abuts against a lower defining wall 17 in the load carrier strut. The fixing portion 6 is further provided with a neck portion 16 which extends through a slot-shaped longitudinal aperture in the lower wall 17 of the load carrier strut. On the underside of the load carrier strut 1, the fixing portion 6 has a part 18 of increased width which, at the top carries abutment surfaces 19 in the transitional region to the neck portion 16. The abutment surfaces 19 are intended, on longitudinal displacement of the fixing portion 6 along the load carrier strut 1, to abut against the underside of the lower defining wall of the load carrier strut.

For positional fixing of the foot 2, the fixing portion 6 and the upper defining wall 20 of the foot 2 have mutually engaging cam or key members 21 and 22 which, on relative displacement of the fixing portion 6 and the foot 2 in the longitudinal direction of the load carrier strut 1, realize a downward drawing of the fixing portion 6 so that its pressure device 15 thereby presses the load carrier strut in a downward direction so that this may be locked in place against the upper wall 20 of the foot 2. Locking of the load carrier strut 1 and the foot 2 takes place in this instance by friction, on the one hand between the load carrier strut and the foot and, on the other hand, between the load carrier strut and the pressure device 15.

The cam or key members include a key surface 21 on the side of the abutment surfaces 19 facing towards the load carrier strut. Correspondingly, the upper wall 20 of the foot 2 has corresponding key surfaces 22 which, in the above-mentioned relative displacement between the fixing portion 6 and the foot 2, realize the downward drawing of the fixing portion. The key surfaces 21 and 22 are opposed inclined planes arranged so that relative sliding movement therebetween results in expansion and contraction of the members upon which the surfaces 21 and 22 are carried in directions transverse to the direction of sliding movement.

The direction of the mutually engaging key members 21 and 22 is such that, when the fixing portion 6 is displaced in a direction out towards the end of the load carrier strut 1, the above-mentioned positional fixing of the foot 2 in relation to the strut 1 is realized. This also entails that, on drawing together of the fixing portion 6 and the operating portion 8, positional fixing of the foot 2 will be achieved on the load carrier strut 1, and a clamping movement will also be imparted to the clamping portion 4.

In order to realize the above-considered drawing together of the fixing portion 6 and the operating portion 8 in a direction towards one another, the pressure device 15 of the fixing portion 6 has a threaded bore 26 running in the longitudinal direction of the load carrier strut and in which engages a screw 23 which, in its opposite end, has two radially projecting flanges 24 which are located on either side of the operating portion 8. Between the flanges 24, the screw has a narrower portion which is accommodated in a recess 27 in the part 25 of the operating portion 8 located interiorly in the load carrier strut 1. Hereby, the screw 23 is free to rotate relative to the operating portion 8 but is axially fixed in relation thereto. From this it follows that, when the screw 23 is rotated in the one direction, it will draw the fixing portion 6 and the operating portion 8 towards one another, which realizes, on the one hand, a positional fixing of the foot 2 on the load carrier strut 1 and, on the other hand, a clamping movement in the clamping portion 4. On rotation of the screw in the opposite direction, the clamping portion 4 is set in motion towards an open position, at the same time as the urging of the pressure device 15 against the inside of the load carrier strut 1 ceases.

Even though the pressure from the pressure device 15 has ceased to act against the inside of the load carrier strut, the fixing portion 6 may remain in the locked position since the key or wedge angle for both of the mutually engaging key member surfaces 21 and 22 is relatively flat. This implies that the positional fixing of the foot 2 on the load carrier strut 1 may, at least in certain cases, be retained even though the clamping portion 4 is located in its open position. In order to safeguard the positional fixing between the foot 2 and the load carrier strut 1, use is made as auxiliary of the above-described eccentric or cam portion 7 which, in the activated position, draws the fixing portion 6 in a downward direction.

The screw 23 has a longitudinal channel of non-rotational symmetric cross section, and the rotary shaft 5 is of corresponding cross section and is accommodated in the channel of the screw. There will hereby be achieved non-rotational interconnection between the shaft 5 and the screw 23, at the same time as axial relative displacement between these parts may be achieved.

Description of Alternative Embodiments

According to the invention, it is also possible to turn the screw 23 to face in the opposite direction compared to that mentioned above so that the screw is thereby in mesh with the operating portion 8 while, via the flanges 24, being axially interconnected with the pressure device 15 but at the same time rotary in relation thereto.

In the foregoing, it has been assumed that the shaft 5 is to be a separate part which is longitudinally displaceable in the screw 23 and which, in its end, is provided with a suitable knob or wheel. It might also be possible to extend the screw 23 so that this replaces the shaft 5, in which event the movement capability which the screw must then have in the longitudinal direction of the load carrier strut 1 is provided for via the anchorage of the screw in the wheel.

The present invention may be modified further without departing from the spirit and scope of the appended Claims.

What is claimed is:

1. A load carrier for connection to a roof of a vehicle, the load carrier comprising:

a load carrier strut;

a first rotary shaft and a second rotary shaft, each rotary shaft having an interior terminal end interiorly disposable in the load carrier strut and an operable end distal from the interior terminal end and oriented for placement to an exterior side of the vehicle; and a first foot and a second foot with each foot adapted for interconnection between the load carrier strut and the roof of the vehicle, each foot coupled to a corresponding rotary shaft, each foot having a rocker pivotally coupled thereto, and each foot further comprising:

a clamping portion pivotally coupled to the rocker and adapted to secure the corresponding foot to the roof of the vehicle; and a fixing portion coupled to the rocker and coupled to the corresponding rotary shaft, the fixing portion adapted for positioning the foot within a displacement range along the load carrier strut in an open position and adapted for securing the foot in a pre-set position in a locking position, wherein rotation of a rotary shaft causes the clamping portion of the corresponding foot to move horizontally and vertically thus securing the corresponding foot to the roof of the vehicle independently of the other foot.

2. The load carrier of claim 1 further comprising a support portion coupled to a corresponding foot and adapted to support the foot on the roof of the vehicle.

3. The load carrier of claim 1 further comprising an operating portion pivotally coupled to the rocker and coupled to the corresponding rotary shaft, wherein rotation of the corresponding rotary shaft causes the operating portion to move horizontally thereby causing the clamping portion of the corresponding foot to move horizontally and vertically.

4. The load carrier of claim 3 further comprising a screw arrangement coupled to the operating portion, the screw arrangement being non-rotationally connectable to the corresponding rotary shaft and disposed within the load carrier strut, the screw arrangement adapted for imparting clamping movement to the clamping portion by drawing the operating portion and the fixing portion towards one another via rotation of the corresponding rotary shaft.

5. The load carrier of claim 4 wherein the screw arrangement comprises a screw engageable with the operating portion and rotatable but axially fixed when engaged thereto.

6. The load carrier of claim 5 wherein the screw has a longitudinal channel of non-rotational symmetric cross section and the corresponding shaft is of corresponding cross section and is longitudinally displaceable in the channel.

7. The load carrier of claim 3 wherein the fixing portion further comprises a pressure device adapted for abutting against an inside of a lower defining wall of the load carrier strut.

8. The load carrier of claim 3 further comprising a stub shaft adapted for coupling the rocker to the foot.

9. The load carrier of claim 3 further comprising a rotary eccentric or cam portion adapted to switch the fixing portion between the open potion and locking position by rotating the rotary eccentric or cam portion.

10. The load carrier of claim 9 wherein the rotary eccentric or cam portion is journalled on a stub shaft of the rocker.

* * * * *